United States Patent
Biser et al.

(10) Patent No.: US 10,377,477 B2
(45) Date of Patent: Aug. 13, 2019

(54) ADJUSTABLE PITCH LINK

(71) Applicant: Bell Helicopter Textron Inc., Fort Worth, TX (US)

(72) Inventors: Joseph Biser, Euless, TX (US); Clifton B. Day, Weatherford, TX (US); Frank B. Stamps, Colleyville, TX (US); Daniel Spivey, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 434 days.

(21) Appl. No.: 13/669,212

(22) Filed: Nov. 5, 2012

(65) Prior Publication Data
US 2013/0168492 A1 Jul. 4, 2013

Related U.S. Application Data

(60) Provisional application No. 61/580,824, filed on Dec. 28, 2011.

(51) Int. Cl.
*B64C 27/605* (2006.01)
*F16C 7/06* (2006.01)

(52) U.S. Cl.
CPC ........... *B64C 27/605* (2013.01); *F16C 7/06* (2013.01); *F16C 2326/43* (2013.01); *Y10T 29/4973* (2015.01)

(58) Field of Classification Search
CPC ......... B64C 11/32; B64C 27/54; B64C 27/59; B64C 27/605; B64C 27/72; B64H 3/00; B64H 3/002; B64H 3/04; B64H 3/12; F16C 7/06; F16C 9/04; F16B 7/06
See application file for complete search history.

(56) References Cited

U.S. PATENT DOCUMENTS

| 141,191 | A |   | 7/1873  | Wilson |
|---------|---|---|---------|--------|
| 2,102,325 | A | * | 12/1937 | Kylstra ........................ 74/579 R |
| 3,217,240 | A | * | 11/1965 | Grant et al. ............ 340/870.35 |

(Continued)

FOREIGN PATENT DOCUMENTS

DE   202012103224 U1 * 11/2012
EP       1805427 A1      7/2007

(Continued)

OTHER PUBLICATIONS

"Terms and Definitions—Aurora Bearing Rod Ends, Spherical Bearings and Bushings" Aurora Bearing Company, retrieved Sep. 26, 2015 http://www.aurorabearing.com/technical-terms-and-definitions.html.*

(Continued)

*Primary Examiner* — Joseph W Sanderson
(74) *Attorney, Agent, or Firm* — Lightfoot & Alford PLLC

(57) ABSTRACT

According to one embodiment, a pitch link includes a first link, a second link coupled to a first end of the first link, a third link coupled to a second end of the first link opposite the first end, and a first bearing housing having a first bearing and a second bearing housing having a second bearing. The first bearing housing is removably coupled to the second link. The second link separates the first bearing housing from the first link. The second bearing housing is removably coupled to the third link. The third link separates the second bearing housing from the first link.

12 Claims, 2 Drawing Sheets

(56) References Cited

U.S. PATENT DOCUMENTS

| | | | |
|---|---|---|---|
| 3,415,324 A * | 12/1968 | Austin, Jr. | 416/61 |
| 3,736,010 A * | 5/1973 | Larkin | 403/104 |
| 3,786,695 A * | 1/1974 | Barrett, Jr. | 74/586 |
| 3,866,650 A | 2/1975 | Larkin | |
| 5,026,254 A | 6/1991 | Ford | |
| 5,174,677 A * | 12/1992 | Doolin et al. | 403/24 |
| 5,431,540 A * | 7/1995 | Doolin et al. | 416/168 R |
| 5,454,153 A | 10/1995 | Noel | |
| 5,460,487 A * | 10/1995 | Schmaling et al. | 416/134 A |
| 5,505,106 A * | 4/1996 | Herman | 74/586 |
| 5,727,926 A * | 3/1998 | Ide et al. | 416/168 R |
| 5,946,981 A * | 9/1999 | Ide et al. | 74/579 R |
| 6,659,399 B1 | 12/2003 | Bagnoli et al. | |
| 6,666,649 B2 * | 12/2003 | Arnold | 416/114 |
| 6,953,313 B2 * | 10/2005 | Tylosky | F16B 7/06 403/322.2 |
| 7,207,854 B1 * | 4/2007 | Anderson et al. | 440/63 |
| 7,524,169 B2 | 4/2009 | Podgurski | |
| 8,371,767 B2 * | 2/2013 | Uhl et al. | 403/46 |
| 2002/0187041 A1 * | 12/2002 | Arnold | 416/25 |
| 2004/0261554 A1 * | 12/2004 | Tylosky | F16B 7/06 74/89.39 |
| 2005/0178215 A1 | 8/2005 | Mayer et al. | |
| 2007/0166162 A1 * | 7/2007 | Podgurski | 416/114 |
| 2008/0115622 A1 * | 5/2008 | Uhl et al. | 74/592 |
| 2009/0205404 A1 | 8/2009 | Swadling | |
| 2009/0218777 A1 * | 9/2009 | Wood | 280/93.51 |
| 2012/0184160 A1 * | 7/2012 | Dudra et al. | 440/63 |
| 2014/0064914 A1 * | 3/2014 | Arnold et al. | 415/1 |

FOREIGN PATENT DOCUMENTS

| | | |
|---|---|---|
| EP | 2067697 A1 | 6/2009 |
| JP | 6-156391 | 6/1994 |
| WO | 2006/042750 | 4/2006 |

OTHER PUBLICATIONS

Official Action in related European Application No. 12194301.3, dated Feb. 13, 2014, 5 pages.

Official Action in related Canadian Application No. 2,800,439, dated Mar. 7, 2014, 2 pages.

Official Action in related European Application No. 12194301.3, dated Jan. 31, 2013, 7 pages.

Official Action in related Canadian Application No. 2,800,439, dated Jan. 22, 2015, 4 pages.

European Search Report in related European Application No. 12194301.3, dated Jan. 31, 2013, 7 pages.

Official Action in related European Application No. 12194303.3, dated Dec. 15, 2014, 4 pages.

* cited by examiner

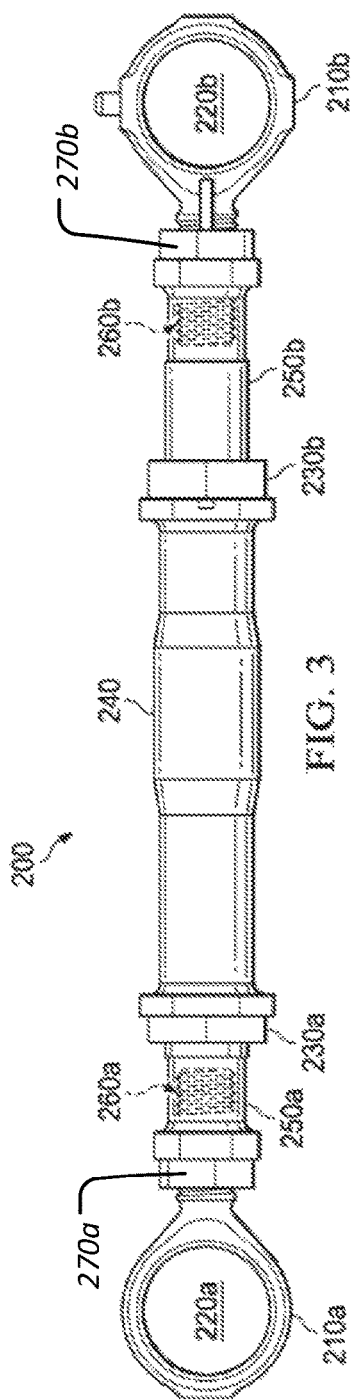
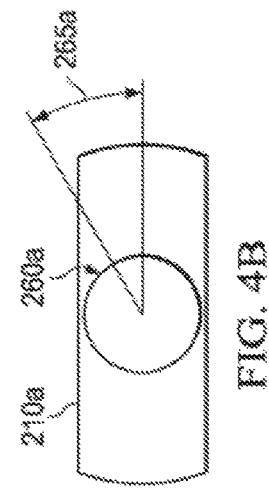
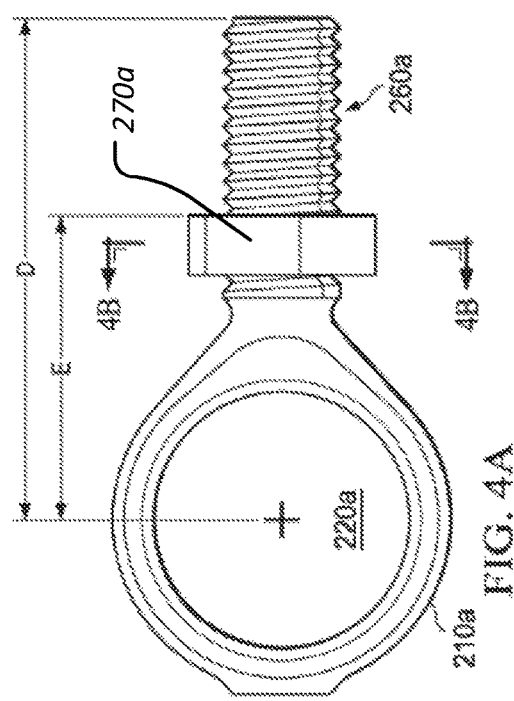

ADJUSTABLE PITCH LINK

RELATED APPLICATIONS

Pursuant to 35 U.S.C. § 119 (e), this application claims priority to U.S. Provisional Patent Application Ser. No. 61/580,824, entitled ADJUSTABLE PITCH LINK, filed Dec. 28, 2011. U.S. Provisional Patent Application Ser. No. 61/580,824 is hereby incorporated by reference.

TECHNICAL FIELD

This invention relates generally to rotor systems, and more particularly, to an adjustable pitch link.

BACKGROUND

A helicopter may include one or more rotor systems. One example of a helicopter rotor system is a main rotor system. A main rotor system may generate aerodynamic lift to support the weight of the helicopter in flight and thrust to counteract aerodynamic drag and move the helicopter in forward flight. Another example of a helicopter rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades.

SUMMARY

According to one embodiment, a pitch link comprises a first link, a second link coupled to a first end of the first link, a third link coupled to a second end of the first link opposite the first end, and a first bearing housing having a first bearing and a second bearing housing having a second bearing. The first bearing housing is removably coupled to the second link. The second link separates the first bearing housing from the first link. The second bearing housing is removably coupled to the third link. The third link separates the second bearing housing from the first link.

Particular embodiments of the present disclosure may provide one or more technical advantages. A technical advantage of one embodiment may include the capability to replace bearings in a rotor pitch link without disturbing the length of the rotor pitch link. A technical advantage of one embodiment may also include the capability to replace bearings in a rotor pitch link without requiring a technician to remeasure the length of the rotor pitch link. A technical advantage of one embodiment may also include the capability to provide a rotor pitch link with replaceable bearings without compromising strength of the bearings.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 shows a pitch link according to one example embodiment;
FIG. 4A shows a plan view of the first bearing housing of FIG. 3;
and
FIG. 4B shows a cross-section view of the first bearing housing of FIG. 3.

DETAILED DESCRIPTION OF THE DRAWINGS

Figure 1:
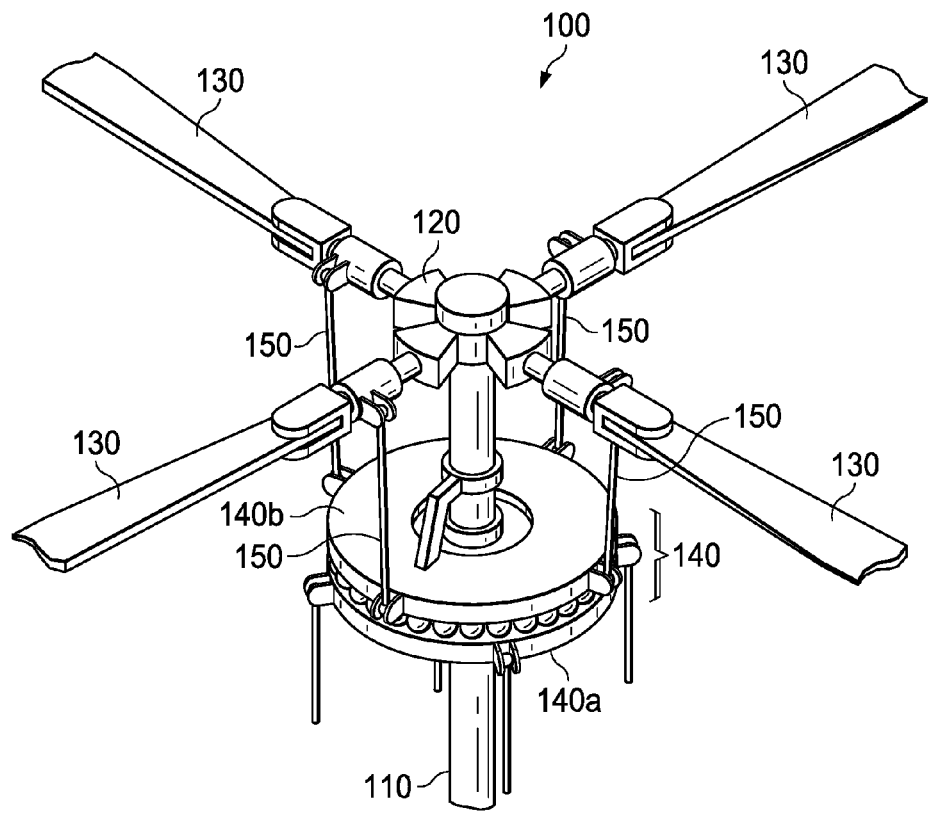
FIG. 1 shows an example helicopter rotor assembly.

FIG. 1 shows an example helicopter rotor assembly 100. In this example, helicopter rotor assembly 100 includes a drive shaft 110, a drive assembly 120, blades 130, a swashplate 140, and pitch links 150. In some examples, helicopter rotor assembly 100 may include more or fewer components. For example, FIG. 1 does not show components such as a gearbox, a yoke, drive links, drive levers, and other components that may be incorporated into helicopter rotor assembly 100.

Drive shaft 110 and drive assembly 120 are mechanical components for transmitting torque and/or rotation. Drive shaft 110 and drive assembly 120 may represent components of a drive train, which may also include an engine, a transmission, differentials, and the final drive (e.g., blades 130). In operation, drive shaft 110 receives torque or rotational energy and rotates drive assembly 120. Rotation of drive assembly 120 causes blades 130 to rotate about drive shaft 110.

Swashplate 140 translates input via helicopter flight controls into motion of blades 130. Because blades 130 are typically spinning when the helicopter is in flight, swashplate 140 may transmit flight controls from the non-rotating fuselage to the rotating drive assembly 120 and/or blades 130.

In some examples, swashplate 140 may include a stationary swashplate 140a and a rotating swashplate 140b. Stationary swashplate 140a does not rotate with drive shaft 110, whereas rotating swashplate 140b does rotate with drive shaft 110. In the example of FIG. 1, pitch links 150 connect rotating swashplate 140b to blades 130. In operation, tilting stationary swashplate 140a causes rotating swashplate 140b to tilt, which in turn moves pitch links 150 up and down. Moving pitch links 150 up and down changes the pitch of blades 130. For example, tilting swashplate 140 toward the left of the helicopter may cause an upward flapping motion of the blade 90 degrees after the blade reaches maximum lift (on the right hand side if the rotor turns counterclockwise as viewed from above). In this example, the plane of the rotor appears to be titled to the left with respect to the fuselage, and the helicopter begins a left (counterclockwise) roll as viewed from behind.

Figure 2:
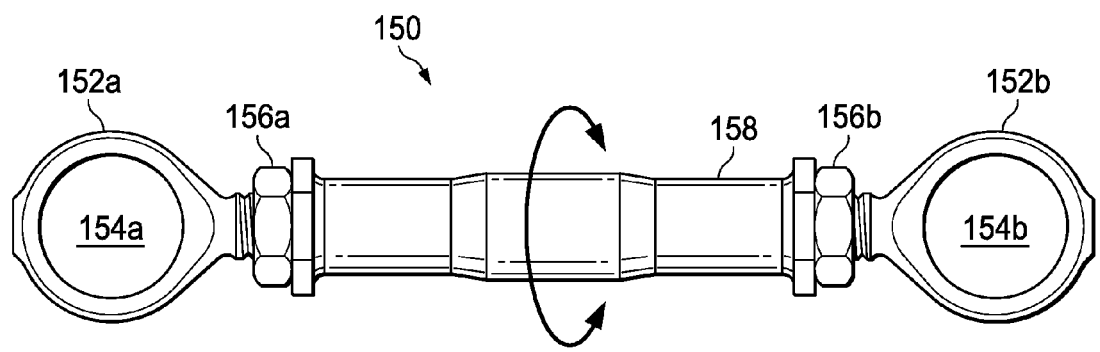
FIG. 2 shows the pitch link of FIG. 1.

FIG. 2 shows pitch link 150 of FIG. 1. In this example, pitch link 150 includes a first bearing housing 152a having a first bearing 154a, a second bearing housing 152b having a second bearing 154b, a first jam nut 156a, a second jam nut 156b, and a link 158.

In this example, the overall length of pitch link 150 is adjustable. To adjust the overall length of pitch link 150, one may loosen first jam nut 156a and/or second jam nut 156b and then rotate link 158 to either increase or decrease the length of pitch link 150. Once the length of pitch link 150 is changed, first jam nut 156a and second jam nut 156b may be tightened against link 158.

In these examples, the lengths of pitch links 150 are not intended to change during flight. An unexpected or unplanned change in length of a pitch link 150 may cause helicopter rotor assembly 100 to become unstable. Changes in length outside the bearing wear tolerances may cause helicopter rotor assembly 100 to endure higher vibrations and oscillatory loads.

In the example of FIG. 2, bearings 154a and 154b are monoball sliding elements with a Teflon liner. Bearings such as bearings 154a and 154b may wear out over time due to normal wear and tear as well as environmental factors. For example, bearings 154a and 154b may wear out faster in a place such as Afghanistan where sand may become stuck in bearings 154a and 154b and scrape against the Teflon liner like sandpaper. Accordingly, bearings 154a and 154b may be replaced over time, such as part of a regular maintenance procedure.

Bearing housings 152a and 152b house bearings 154a and 154b. In the industry, receptacles located near the end of a pitch link configured to receive bearings are known as bearing housings. In the example pitch link 150 of FIG. 2, bearings 154a and 154b are staked into bearing housings 152a and 152b. With a staked-in bearing, a flange of material is deflected to permanently keep the bearing in its housing. Attempting to remove a staked-in bearing from its housing may cause damage to the housing.

To replace staked-in bearings 154a and 154b of pitch link 150, one may loosen jam nuts 156a and 156b to release bearing housings 152a and 152b. Old bearing housings 152a and 152b may be replaced with new bearing housings 152a and 152b, and new bearing housings 152a and 152b may be secured to link 158 by retightening jam nuts 156a and 156b.

As stated previously, bearings 154a and 154b are permanently staked in bearing housings 152a and 152b. Replacing bearing housings 152a and 152b, however, may inadvertently cause the length of pitch link 150 to change.

Other mechanisms are also available to replace bearings 154a and 154b. For example, bearings 154a and 154b may be secured in bearing housings 152a and 152b without staking-in bearings 154a and 154b. By securing bearings 154a and 154b in bearing housings 152a and 152b without staking-in bearings 154a and 154b, one may theoretically replace bearings 154a and 154b without moving bearing housings 152a and 152b and/or jam nuts 156a and 156b. In addition, non-staked solutions may not be suitable for high oscillatory loads typical in rotor systems.

Certain embodiments provide the capability to replace bearings, such as staked-in bearings, while maintaining the original length of a pitch link. Certain embodiments also provide the capability to replace bearings in a rotor pitch link without requiring a technician to remeasure the length of the rotor pitch link.

FIG. 3 shows a pitch link 200 according to one example embodiment. In this example, pitch link 200 includes a first bearing housing 210a housing a first bearing 220a, a second bearing housing 210b housing a second bearing 220b, a first jam nut 230a, a second jam nut 230b, and links 240, 250a, and 250b.

In this example, links 240 and 250a are coupled together via threads, and first jam nut 230a prevents links 240 and 250a from dethreading. Links 240 and 250b are also coupled together via threads, and second jam nut 230b prevents links 240 and 250b from dethreading. First bearing housing 210a threads into link 250a along first bearing housing thread 260a. Second bearing housing 210b threads into link 250b along second bearing housing thread 260b.

In this example, the overall length of pitch link 200 is adjustable by adjusting the overall combined length of links 240, 250a, and 250b. To adjust the combined overall length of links 240, 250a, and 250b, one may loosen first jam nut 230a and/or second jam nut 230b and then rotate link 240 to either increase or decrease the length of pitch link 200. Once the length of pitch link 200 is changed, first jam nut 230a and second jam nut 230b may be tightened against link 240.

As shown in FIG. 3, the first bearing housing 210a is rotatable relative to the second link 250a and a first bearing housing nut 270a is configured to selectively lock the first bearing housing 210a in any angular orientation relative to the second link 250a without limitation. As also shown in FIG. 3, the second bearing housing 210b is rotatable relative to the third link 250b and a second bearing housing nut 270b is configured to selectively lock the second bearing housing 210b in any angular orientation relative to the third link 250b without limitation.

Unlike the example pitch link 150 of FIG. 2, however, bearing housings 210a and 210b of pitch link 200 may be removed and replaced without disturbing jam nuts 230a and 230b. To replace bearing housings 210a and 210b, one may unscrew bearing housings 210a and 210b from bearing housing threads 260a and 260b. Old bearing housings 210a and 210b may be replaced with new bearing housings 210a and 210b, which may be inserted along bearing housing threads 260a and 260b. Thus, by providing link 250a between first bearing housing 210a and adjustment link 240, and by providing link 250b between second bearing housing 210b and adjustment link 240, bearing housings 210a and 210b may be replaced without disturbing the overall length of pitch link 200.

FIG. 4A shows a plan view of the bearing housing 210a of FIG. 3. FIG. 4B shows a cross-section view of the bearing housing 210a of FIG. 3 (with the jam nut not shown for purposes of clarity). FIG. 4A shows bearing housing 210a having first bearing housing thread 260a. Link 250a has an opening (not shown) for receiving first bearing housing thread 260a.

As explained previously, an old first bearing housing 210a may be replaced with a new first bearing housing 210a. The new first bearing housing 210a would have a similar thread for screwing into link 250a. For example, old and new first bearing housings 210a would have threads with approximately the same threads-per-inch. In addition, the new first bearing housing 210a would need to have the same distance to the bearing to prevent changing the location of the bearing. For example, the new first bearing housing 210a may have the same Distance D and/or Distance E, as shown in FIG. 4A.

In some circumstances, however, having the same threads-per-inch and same distance to the bearing may not be sufficient. Each first bearing housing 210a should be installed in the same position and clocking. If the old first bearing housing 210a and the new first bearing housing 210a are not clocked at the same angle, then the clocking of the new first bearing housing 210a may not leave sufficient clearance to prevent impinging on other rotor system components (which could cause damage). In addition, if the old first bearing housing 210a is not clocked at the same angle as the new first bearing housing 210a, then the new bearing 220a will not be oriented in the same direction as the old bearing 220a. In some circumstances, this could result in the new bearing 220a not being aligned to mount on its corresponding post attached to drive assembly 120, blade 130, and/or swashplate 140.

Accordingly, certain embodiments provide the capability to provide fixed-index threads for each first bearing housing 210a. As shown in FIG. 4B, the beginning of thread 260a is indexed with respect to the face of first bearing housing 210a. In the example of FIG. 4B, thread 260a begins at an angle 265a relative to the face of first bearing housing 210a.

By maintaining a consistent angle 265a for every first bearing housing 210a produced, each first bearing housing 210a may be used interchangeably.

In the example of FIG. 4B, both old and new first bearing housings 210a have a thread 260a that begins at the tip at the same angle 265a relative to the face of first bearing housing 210a. In another example embodiment, thread 260a may end at the face of first bearing housing 210a at the same angle instead of and/or in addition to beginning at the tip at the same angle. For example, if each first bearing housing 210a has the same Distance E, as shown in FIG. 4A, then each thread 260a may end at the face of the first bearing housing 210a at the same angle.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotorcraft, comprising:
    a body;
    a power train coupled to the body and comprising a power source and a drive shaft coupled to the power source;
    a hub coupled to the drive shaft;
    a rotor blade coupled to the hub;
    a swashplate positioned about the drive shaft; and
    a pitch link coupled between the swashplate and the hub corresponding to the rotor blade, the pitch link comprising:
        a link assembly having an overall adjustable length, the link assembly comprising a first link, a second link coupled to a first end of the first link, and a third link coupled to a second end of the first link opposite the first end;
        a first bearing housing comprising a first eyelet having a first bearing disposed in the first eyelet, the first bearing housing removably coupled to the second link, the second link separating the first bearing housing from the first link; and
        a second bearing housing comprising a second eyelet having a second bearing disposed in the second eyelet, the second bearing housing removably coupled to the third link, the third link separating the second bearing housing from the first link;
        wherein the first bearing housing is rotatable relative to the second link and wherein a first bearing housing nut is configured to selectively lock the first bearing housing in any angular orientation relative to the second link without limitation;
        wherein the second bearing housing is rotatable relative to the third link and wherein a second bearing housing nut is configured to selectively lock the second bearing housing in any angular orientation relative to the third link without limitation; and
        wherein each of the first link, the second link, and the third link are rod-shaped and comprise no eyelets.

2. The rotorcraft of claim 1, further comprising:
    a first jam nut coupling the first link to the second link; and
    a second jam nut coupling the first link to the third link.

3. The rotorcraft of claim 2, wherein the overall adjustable length is adjustable by adjusting at least one of the first jam nut and the second jam nut.

4. The rotorcraft of claim 1, wherein the second link separates the first bearing housing from the first link such that removal of the first bearing housing does not alter the overall adjustable length.

5. The rotorcraft of claim 1, wherein the first bearing housing threads into the second link.

6. A pitch link, comprising:
    a link assembly having an overall adjustable length, the link assembly comprising:
        a first link;
        a second link coupled to a first end of the first link; and
        a third link coupled to a second end of the first link opposite the first end;
    a first bearing housing comprising a first eyelet having a first bearing disposed in the first eyelet, the first bearing housing removably coupled to the second link, the second link separating the first bearing housing from the first link; and
    a second bearing housing comprising a second eyelet having a second bearing disposed in the second eyelet, the second bearing housing removably coupled to the third link, the third link separating the second bearing housing from the first link;
        wherein the first bearing housing is rotatable relative to the second link and wherein a first bearing housing nut is configured to selectively lock the first bearing housing in any angular orientation relative to the second link without limitation;
        wherein the second bearing housing is rotatable relative to the third link and wherein a second bearing housing nut is configured to selectively lock the second bearing housing in any angular orientation relative to the third link without limitation; and
    wherein each of the first link, the second link, and the third link are rod-shaped and comprise no eyelets.

7. The pitch link of claim 6, further comprising:
    a first jam nut coupling the first link to the second link; and
    a second jam nut coupling the first link to the third link.

8. The pitch link of claim 7, wherein the overall adjustable length is adjustable by adjusting at least one of the first jam nut and the second jam nut.

9. The pitch link of claim 6, wherein the second link separates the first bearing housing from the first link such that removal of the first bearing housing does not alter the overall adjustable length.

10. The pitch link of claim 6, wherein the first bearing housing threads into the second link.

11. The pitch link of claim 10, wherein the first bearing housing and the second link have threads.

12. The pitch link of claim 6, wherein the first bearing is a monoball sliding element bearing.

* * * * *